A. F. HAWKINS.
BATTERY TERMINAL.
APPLICATION FILED AUG. 2, 1919.
1,400,059.
Patented Dec. 13, 1921.
2 SHEETS—SHEET 1.
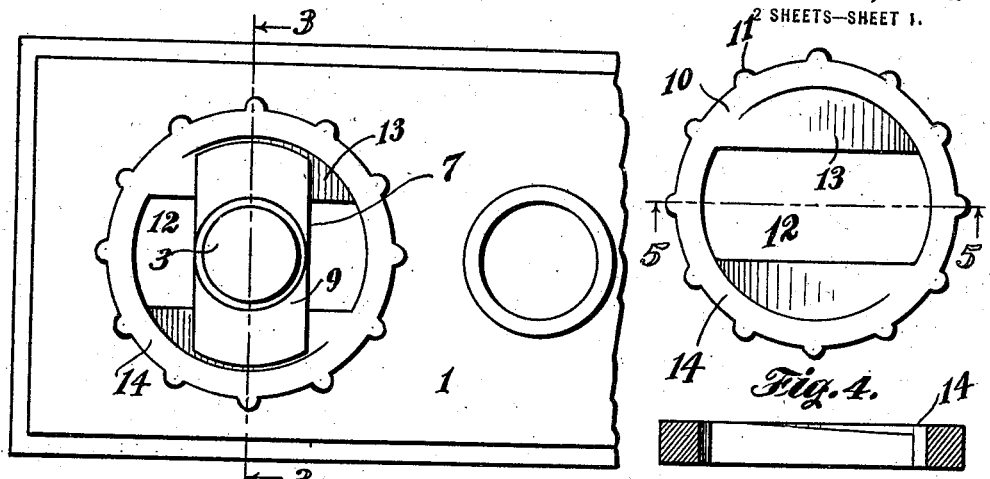
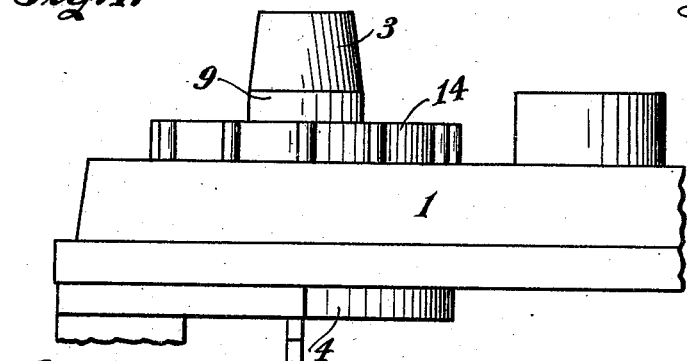
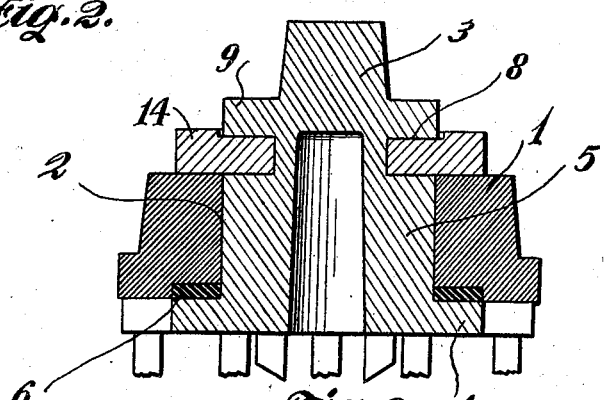
Inventor
ALDA F. HAWKINS.
By Jack A. Schly
Attorney A. F. HAWKINS.
BATTERY TERMINAL.
APPLICATION FILED AUG. 2, 1919.
1,400,059.
Patented Dec. 13, 1921.
2 SHEETS—SHEET 2.
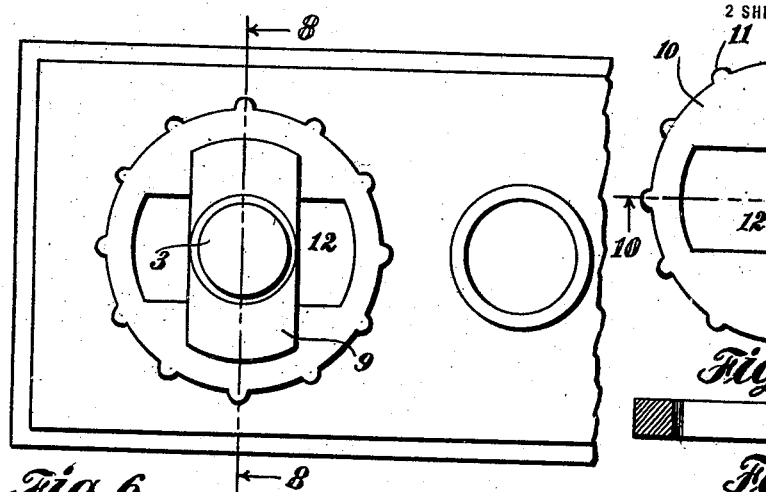
Fig. 6.
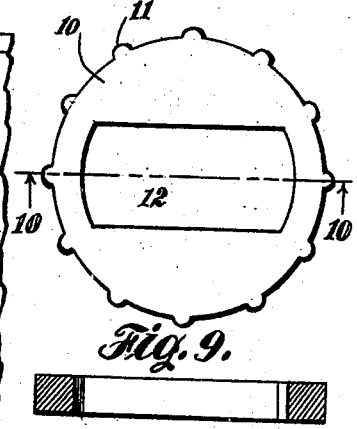
Fig. 9.
Fig. 10.
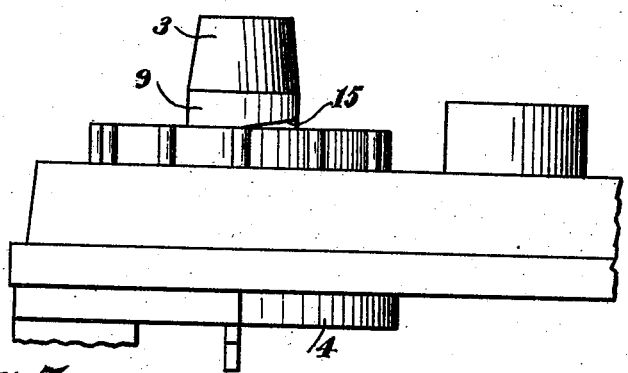
Fig. 7.
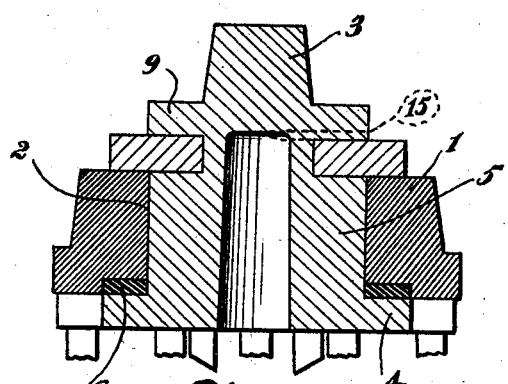
Fig. 8.
Inventor
ALDA F. HAWKINS.
By Jack A. Schley
Attorney

UNITED STATES PATENT OFFICE.

ALDA F. HAWKINS, OF FORT WORTH, TEXAS, ASSIGNOR TO STANDARD BATTERY MANUFACTURING COMPANY, OF FORT WORTH, TEXAS, A CORPORATION OF TEXAS.

BATTERY TERMINAL.

1,400,059.            Specification of Letters Patent.      Patented Dec. 13, 1921.

Application filed August 2, 1919. Serial No. 314,984.

*To all whom it may concern:*

Be it known that I, ALDA F. HAWKINS, a citizen of the United States, residing at Fort Worth, in the county of Tarrant and State of Texas, have invented certain new and useful Improvements in Battery Terminals, of which the following is a specification.

This invention relates to new and useful improvements in battery terminals.

Storage or secondary battery terminals are usually made of soft metal and are fastened to hard rubber covers. It is therefore obvious that the fastening must be simple and have a minimum movement; otherwise the soft metal parts would soon wear and become inoperative. Tests made with screw threads show that a very "quick" thread must be used and such threads are difficult and expensive to cast.

I have conceived the idea of employing a nut or fastening member and a post recessed to receive the nut so that the parts are fastened by a wedging action given by less than a quarter of the nut and are easily unfastened.

The invention will be more readily understood from a reading of the following specification and by reference to the accompanying drawings, in which an example of the invention is shown, and wherein:

Figure 1 is a plan view of a fastening embodying one form of the invention,

Fig. 2 is a side elevation of the same,

Fig. 3 is a vertical sectional view,

Fig. 4 is a plan view of the nut,

Fig. 5 is a cross-sectional detail on line 5—5 of Fig. 4.

Fig. 6 is a plan view of a modified form of fastening,

Fig. 7 is an elevation of the same,

Fig. 8 is a vertical sectional view,

Fig. 9 is a plan view of the modified nut, and

Fig. 10 is a cross-sectional view on the line 10—10 of Fig. 9.

In the drawings the numeral 1 designates a cover plate which is usually formed of hard rubber or equivalent material. The cover has a circular opening 2 for receiving a metal terminal post 3 which latter is connected with a terminal plate 4 under the cover. The base 5 of the post is cylindrical and receives a soft rubber washer 6 which is interposed between the plate 4 and the cover and prevents the fluid spilling out around the post.

Above the base the post is cut away on each side to provide flat faces 7, above which latter the post is reduced in diameter and tapered.

The post at right angles to its flat faces 7 has recesses 8 which provide overhanging lugs 9. The recesses have their lower edges in juxtaposition to the top of the cover. A circular nut 10 is provided with knobs 11 on its periphery affording an efficient finger grip. The nut has an elongated slot 12 shaped to receive the flat portion of the post and rest on the cover 1. At each side of the slot the nut has countersunk inclined webs 13 contiguous to the flat faces 7 when the nut is first placed on the post.

The webs are oppositely inclined so that when the nut is turned to the right diagonally opposite edges of the lugs 9 will ride onto the lowest ends of the webs and the latter will be received into the recesses 8 as the rotation is continued. The webs incline up to and merge into the surface of the nut. Uusually not more than a one-eighth of a rotation is necessary to wedge the nut in the recess. It will be seen that as the nut is turned it has a tendency to bear down on the top surface of the cover which is resiliently supported by the rubber washer 6.

The nut may be quickly put on or removed and is easy and cheap to cast, as is also the post. The nut has an annular marginal flange 14 which lends strength and body to the same.

In Figs. 6 to 10 inclusive I have shown a modified form of fastening. In this form the inclined webs 13 and the marginal flange 14 are omitted, thus giving the nut the same thickness throughout. The slot 12 is the same. The underfaces of the lugs 9 are beveled at diagonally opposite corners of the posts, the bevels 15 vanishing at the center of the lug. It will be seen that by placing the nut over the post and giving it a slight rotation, its solid portions enter the recesses 8 and wedge under the lugs. This form is cheaper to manufacture and is more desirable in some instances.

What I claim, is:

In a battery terminal fastening, a terminal post having lugs and flat sides connecting the lugs, and a nut having a slot shaped to receive the lugs and pass down the flat sides, one of said elements having diagonally disposed inclined faces at points of contact with the other element, whereby the nut and lugs are wedged together when the nut is turned and swung under the lugs.

In testimony whereof I affix my signature.

ALDA F. HAWKINS.